No. 814,182. PATENTED MAR. 6, 1906.
W. J. ANDERSON & J. W. HORNEY.
CORN PLANTER.
APPLICATION FILED JUNE 18, 1904.

2 SHEETS—SHEET 1.

Witnesses
William J. Anderson
and James W. Horney Inventors

No. 814,182. PATENTED MAR. 6, 1906.
W. J. ANDERSON & J. W. HORNEY.
CORN PLANTER.
APPLICATION FILED JUNE 18, 1904.
2 SHEETS—SHEET 2.
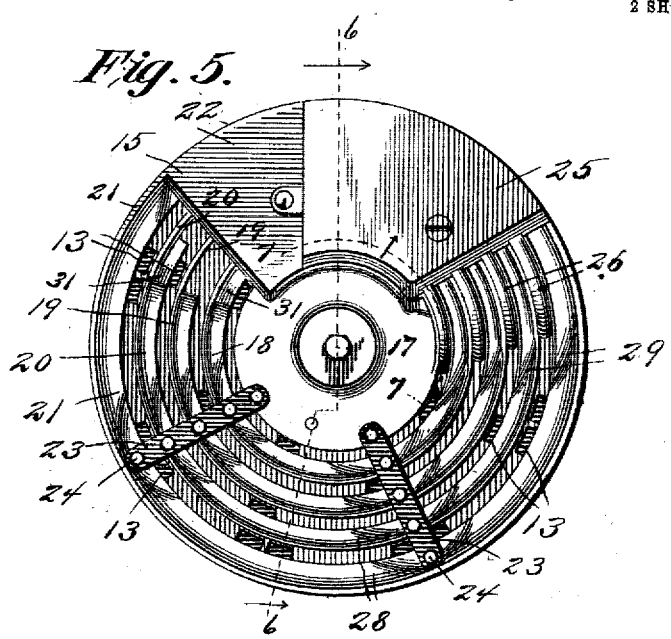
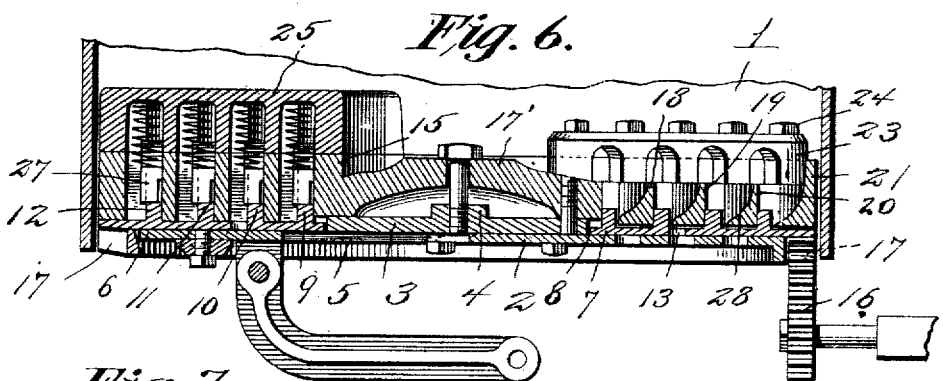
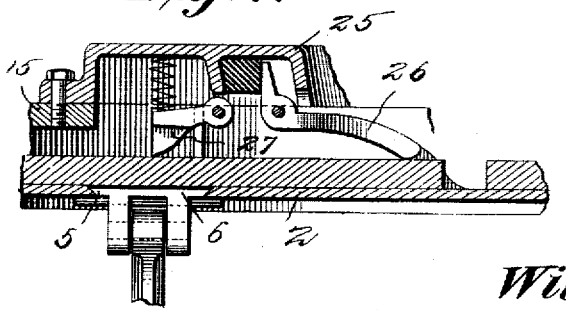
Witnesses
William J. Anderson
and James W. Horney, Inventors
by C. A. Snow & Co.
Attorneys

UNITED STATES PATENT OFFICE.

WILLIAM J. ANDERSON AND JAMES W. HORNEY, OF LODA, ILLINOIS.

CORN-PLANTER.

No. 814,182.    Specification of Letters Patent.    Patented March 6, 1906.

Application filed June 18, 1904. Serial No. 213,147.

*To all whom it may concern:*

Be it known that we, WILLIAM J. ANDERSON and JAMES W. HORNEY, citizens of the United States, residing at Loda, in the county of Iroquois and State of Illinois, have invented a new and useful Corn-Planter, of which the following is a specification.

This invention relates to corn-planters, and especially to corn-planters of that type which are provided with a rotary seed plate or disk having perforations constituting seed cups or cells, each adapted to hold a single seed and to carry the same forward to the point of discharge.

The invention has special reference to that class of rotary-disk planters in which means are provided for setting the seeds on edge instead of permitting them to lie flat in the seed cups or cells, this being considered the most certain way of regulating the seeding mechanism so that each cup or cell shall only contain a single seed.

In carrying the invention into practical operation we avail ourselves of the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications which come fairly within the scope of the invention may be resorted to without departing from the spirit or sacrificing the efficiency of the same.

Figure 1:
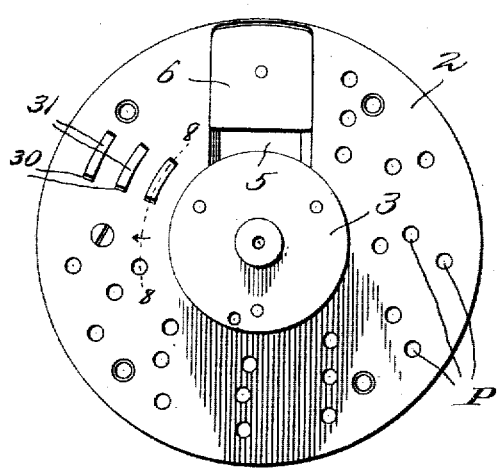
Figure 2:
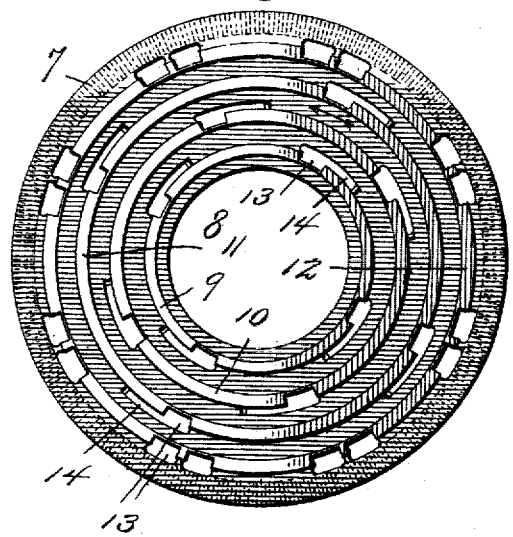
Figure 3:
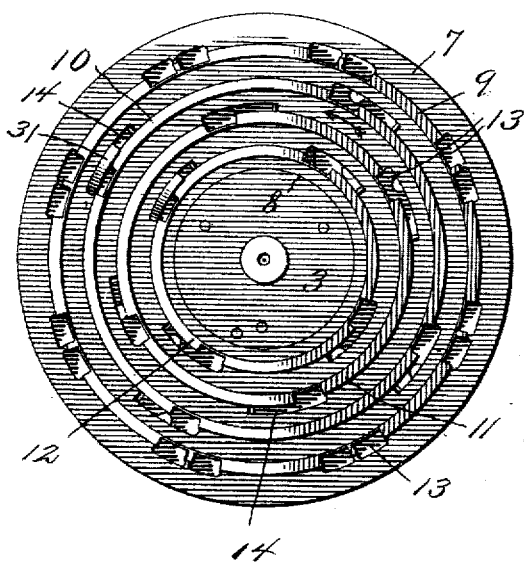
Figure 4:
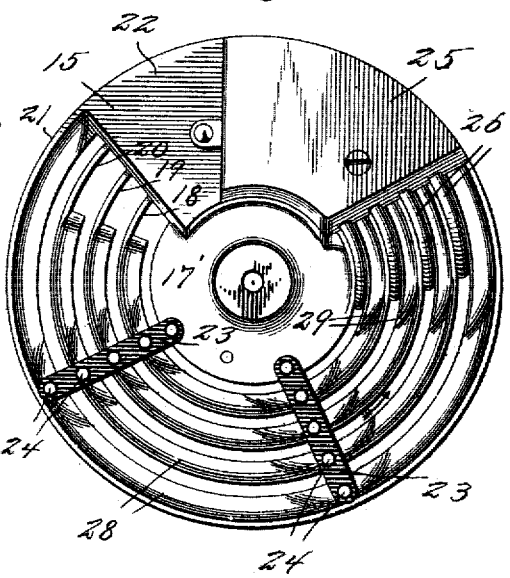

In said drawings, Figure 1 is a plan view of the bottom plate or disk of the improved seed-planting device. Fig. 2 is a top plan view of the rotary seed-disk. Fig. 3 is a plan view showing the rotary seed-disk mounted for rotation upon the bottom plate. Fig. 4 is a top plan view of the top plate of the device. Fig. 5 is a top plan view showing the top plate mounted operatively in position above the rotary seed-disk, the latter being supported upon the bottom plate. Fig. 6 is a sectional view, enlarged, taken on the line 6 6 in Fig. 5. Fig. 7 is a sectional view, enlarged, taken on the line 7 7 in Fig. 5. Fig. 8 is a sectional view taken on the line 8 8 in Fig. 1.

Corresponding parts in the several figures are indicated by similar characters of reference.

This invention is applicable to various forms of rotary-disk seed-planters; but for purposes of illustration we have preferred to show the invention applied to a planter adapted to distribute at each operation a charge consisting of two or more seeds, the construction being such that by alternate operations charges consisting of equal or of different numbers of seeds may be deposited. This general construction has been shown and claimed in an application for Letters Patent filed by ourselves October 27, 1903, Serial No. 178,762, patented July 12, 1904, No. 764,544. The details of this construction, therefore, need not be particularly described in the present case.

In carrying out the invention a hopper 1 is employed, which may consist of a can or casing of any desired size, shape, and material. Usually a cylindrical sheet-metal can will be found advantageous for the purpose of the invention. Securely mounted in the bottom of the can 1 is a bottom plate 2, which is circular in shape and which is provided on its upper side with a circular guide-plate 3, from which rises a concentrically-disposed boss 4. The bottom plate is provided with a radial opening or slot 5, forming a seed-escape opening and which may communicate directly with the upper end of a conducting-tube, which latter, being no part of the invention, has been omitted from the drawings. An adjusting-slide 6, suitably mounted and operated, serves to regulate the size of the seed-escape opening.

The bottom plate supports the seed-disk 7, which has a central opening 8 engaging the circular guide-plate 3 upon the bottom plate. In the example of the invention illustrated in the accompanying drawings the seed-plate or seed-disk is shown as being provided with four concentric series of openings constituting cells or seed-cups. The seed-disk is provided with four concentric annular ribs in its upper side, (designated 9, 10, 11, and 12,) the rib 9 being the inner and the rib 12 being the outer one. The several ribs are provided with cut-away portions forming recesses 13, or perhaps, more properly, slots, since openings are cut not only in the ribs or walls, but through the plate constituting the seed-disk. The latter or the portions of the latter disposed adjacent to the recesses in the ribs are, moreover, cut away, so as to form slots 14, which are disposed not only adjacent to the recesses 13, but which extend in rear of the latter, as will be clearly seen in Fig. 2 of the drawings.

The rearward extensions of the slots 14 are omitted adjacent to the recesses or seed-cups formed in the outer rib 12, for the reason that in this rib two seed cups or cells are usually formed closely adjacent to each other, as will be seen in the drawings. The precise arrangement of seed-cups herein shown and described is not necessarily carried out; but it has been shown by preference, for the reason that owing to this particular arrangement the dropping of the seeds may be very accurately regulated, as shown and claimed more particularly in our Patent No. 764,544, to which reference has hereinbefore been made.

The top plate 15 is mounted upon the boss 4, whereby it is supported above the seed-disk in such a manner as to permit the latter to be freely rotated, the rotation of the latter being accomplished, for instance, by a suitably-operated pinion, as 16, meshing with teeth 17, formed circumferentially upon the under side of the seed-disk, which is so supported as to make this arrangement a feasible and convenient one. The operation of the seed-disk by means of a pinion may be either continuous or intermittent, as may be desired. The top plate 15 in the present instance includes a center disk 17' and four concentric annular members 18, 19, 20, and 21, which said annular members have been shown as being connected by means of a web 22 and in addition thereto by means of cross-braces 23, secured to the several members by means of screws or bolts 24. These annular members fit nicely between and adjacent to the ribs 9, 10, 11, and 12, the interspaces between which are thus occupied. A casing 25, supported by the annular members of the top plate, contains cut-off fingers 26 and spring-actuated ejectors 27, which latter are disposed directly above the slide 6, which governs the size of the seed opening or passage 5. Said slide, it will be observed, is mounted to move radially from the center in an outward direction, thus enabling said slide to regulate the size of the seed-opening, or, in other words, to permit seeds to be dropped from one or more of the circumferentially-disposed series of seed-cups, reckoning from the outer edge of the device and in an inward direction. The seed-cups have been so distributed that at each operation an equal number of seeds may be deposited or that by alternate operations charges of seed varying in size may be dropped; but this feature of the device is not part of the subject-matter of the present application.

The annular members 18, 19, and 20 of the top plate constitute partition-walls between the ribs 9, 10, and 11, and the outer annular member 21 forms or constitutes a wall adjacent to the outermost rib 9. These walls or partitions are formed upon their inner sides with concavities 28, extending over the greater portion of their length, said concavities begining at a short distance from the web 22 and terminating adjacent to the cut-off fingers 26 within the casing 25. The annular members 18, 19, and 20 are provided at the front ends of their convex portions with inclined planes 29, upon which the seed-corn may ride in an upward direction when the machine is in operation, the said annular members being, in front of this point, free from the inward extensions forming the concavities 28. At a corresponding point the bottom plate of the device is provided with sockets 30, in which are seated upwardly-extending spring-actuated pawls 31, which normally are confined between the bottom plate and the side plate, but which when the recesses or openings 14 adjacent to the seed-cups approach the inclined planes at the lower ends of the annular members will be forced upwardly against the under sides of said annular members, so as to form ways or guides, whereby the seed-corn is caused to slide upwardly upon said inclined planes, thus to some extent agitating the seeds and making it impossible for more than one seed to enter into the seed cup or cell 13, formed in the rib adjacent to the opening 14 into which one of the pawls 31 is at the time projected.

The "rear" ends of the annular members, meaning thereby the ends of said annular members which are disposed adjacent to the cut-off fingers contained in the casing 25, and which fingers are spring-actuated and occupy the interspaces between the annular members, so as to prevent more than one seed from being carried by each cup or cell to the point of discharge, are upwardly inclined and terminate adjacent to the recesses in the casing 25, in which the cut-off fingers are mounted. A positive cut-off is thus formed, whereby any seeds which may be disposed to follow and be carried around with the cups or cells containing the individual seeds that are to be deposited at the next operation of the machine will be deflected, thus avoiding the crushing or injuring of seeds and at the same time constituting a device which is mechanically perfect as to the operation thereof.

From the foregoing description, taken in connection with the drawings hereto annexed, the operation and advantages of our invention will be readily understood by those skilled in the art to which it appertains. It is to be distinctly understood that no limitation is made as to the number of annular concentric series of seed-cups and dropping devices employed. A single circumferential series of seed-cups, or, in fact, a rotary element having but a single seed-cup, would be within the scope of the invention, since in the latter case the seed-disk might be rapidly rotated, and means might be provided whereby the seeds might be retained until a sufficient number be accumulated to constitute a charge or hill. By the rotation of the seed-disk the seed which is contained in the can or hopper 1 above the top plate 15 will be guided by the cavities upon the inner sides of the annular members in the direction of the ribs upon the seed-disk in which the recesses constituting the seed cups or cells are formed. At the beveled or inclined front ends 29 of the members 28 the seeds will enter into the seed-cups, the spring-actuated pawls disposed at this point and entering the slots 14 extending rearwardly from the seed-cups serving to expel or displace seeds that are not required to enter into the seed-cups and also to tilt or set on edge the seeds entering into the seed-cups, which latter are comparatively narrow and of a general shape and size to accommodate a single seed in the position indicated. It is obvious that in case a seed should fail to enter into the cell at the point indicated a seed will be sure to enter into each cell during the subsequent rotation of the seed-disk and before it reaches the point of discharge. In case an additional seed should be carried around with the seed lodged in any one of the seed-cups it will be unfailingly dislodged by the upwardly-inclined rear end of one of the annular members which constitute the partitions between the ribs having seed-cups, so that the latter under no circumstances will carry more than one seed each to the point of discharge.

The importance of being able to regulate the discharge of seeds from a planter with absolute certainty and uniformity is now so generally understood as to require no further comment. By this invention the regulation of the deposit of the seeds may be accomplished in such a manner that any predetermined number of seeds may be deposited at each operation of the device with practically unfailing certainty.

As seen clearly in Fig. 1 of the drawings, the base-plate 2 of the device is provided with a plurality of perforations P, which are disposed in concentric series and out of alinement with the seed-cells in the superposed seed-disk. These perforations are for the purpose of enabling any grit or foreign substances which may by any chance pass between the base-plate 2 and the seed-disk to gradually work out in order that the perfect operation of the machine may not be obstructed thereby.

Having thus described the invention, what is claimed is—

1. A dropping mechanism for corn-planters comprising concentrically-arranged seed-plates formed with seed-cells in their adjacent edges, and means for rotating said plates.

2. The combination with a movable disk having seed-cells and slots adjacent to said cells, of seed-tilting means disposed below said disk.

3. The combination with a movable disk having seed-cells and slots adjacent to said cells, of spring-actuated seed-tilting means disposed below said disk.

4. In an edge-drop seed-planter, a rotary seed-disk, a concentric rib upon said disk, a seed-cell formed in said rib and extending through the disk, and a slot formed in the disk adjacent to and extending rearwardly from the seed-cell adjacent to the rib in which the latter is formed.

5. In a seed-planter, a rotary seed-disk having concentric ribs on its upper face, seed-cells formed in the exterior faces of said ribs and extending through the disk, slots in the latter, adjacent to and extending rearwardly from the seed-cells, and means for engaging said slots to tilt the seeds edgewise into the seed-cells.

6. In a seed-planter of the class described, a bottom plate, a seed-disk mounted for rotation on said plate, seed-cells in said disk, slots in the latter, extending adjacent to and rearwardly from the seed-cups, and spring-actuated pawls in the bottom plate adapted to engage said recesses to tilt seeds edgewise into the cup or cells.

7. In a seed-planter of the class described, a bottom plate, a seed-disk mounted for rotation upon said bottom plate and having a plurality of concentric ribs, seed-cells formed in the outer edges of said ribs and extending through the disk, slots in said disk adjacent to and extending rearwardly from the seed-cups, and spring-actuated pawls mounted in the base-plate in registry with the slotted interspaces between the ribs upon the seed-disk.

8. In a seed-planter of the class described, a seed-disk mounted for rotation and provided with concentric ribs having seed-cells formed therein and a top plate composed of annular members supported adjacent to the ribs of the seed-disk and having sides sloping in the direction of the seed-cells.

9. In a planter of the class described, a seed-disk mounted for rotation and having a plurality of ribs, seed-cells formed in said ribs and disk, slots in said disk adjacent to and extending rearwardly from the seed-cups, means, below the seed-disk, for engaging the slots and tilting the seeds at the point where the cells are fed and a top plate including a plurality of annular members supported above the seed-disk, said annular members fitting in the interspaces between the ribs and having concave sides sloping in the direction of the seed-cells.

10. In a seed-planter of the class described, a bottom plate having a slide, a seed-disk mounted for rotation upon said bottom plate and having concentrically-disposed ribs, recesses constituting seed-cells formed in said ribs, a disk and slots in the latter adjacent to and extending rearwardly from the seed-cells, a top plate comprising a plurality of annular members having concave inner sides sloping in the direction of the seed-cells and provided at their front ends with inclined planes, and pawls mounted in the bottom plate in registry with the slots in the seed-disk adjacent to the seed-cells.

11. In a seed-planter of the class described, a bottom plate having a seed-opening and a slide regulating said opening, a seed-disk mounted for rotation upon said bottom plate and having ribs, seed-cells formed in said ribs and disk, and slots adjacent to and extending rearwardly from said seed-cells, a top plate including a plurality of annular members engaging the interspaces between the ribs of the seed-disk and supported above the latter, said annular members having inclined planes at their front and rear ends and intermediate concave sides sloping in the direction of the seed-cups, spring-actuated cut-off fingers disposed adjacent to the inclined planes at the rear ends of the inner members of the top plate, and spring-actuated ejectors supported above the seed-opening in the bottom disk.

12. In an edge-drop seed-planter, a seed-receptacle, a seed-disk mounted for rotation and having seed-cells and slots adjacent to said cells, an annular member having a concave side sloping in the direction of the seed-cups, an inclined plane at the receiving end of the annular member, a spring-actuated pawl disposed to guide the seeds to said inclined plane, and an inclined plane at the terminal end of the annular member, serving to guide seeds not contained in the seed-cups past the cut-off fingers near the discharge.

13. In a seed-planter, the combination with a base-plate, of a seed-disk mounted for rotation upon said base-plate, the latter being provided with a plurality of perforations out of alinement with the seed-cells in the seed-disk.

In testimony that we claim the foregoing as our own we have hereto affixed our signatures in the presence of two witnesses.

WILLIAM J. ANDERSON.
JAMES W. HORNEY.

Witnesses:
WILLIAM PETERS,
JOHN WOODARD.